United States Patent
Beall et al.

[11] 3,801,295
[45] Apr. 2, 1974

[54] MICA GLASS-CERAMICS

[75] Inventors: George H. Beall, Big Flats; Chi-Kwun Chyung, Elmira; Harry J. Watkins, Ithaca, all of N.Y.

[73] Assignee: Corning Glass Works, Corning, N.Y.

[22] Filed: Aug. 1, 1972

[21] Appl. No.: 276,971

[52] U.S. Cl. ................................. 65/33, 106/39.6
[51] Int. Cl. ...................... C03b 29/00, C03c 3/22
[58] Field of Search ...................... 65/33; 106/39.6

[56] References Cited
UNITED STATES PATENTS 3,149,982  9/1964  Eppler .............................. 65/33 X
3,325,265  6/1967  Stookey ............................... 65/33

Primary Examiner—Frank W. Miga
Attorney, Agent, or Firm—Clinton C. Janes, Jr.

[57] ABSTRACT

This invention relates to the production of glass-ceramic articles wherein the predominant crystal phase is a synthetic fluormica. The articles have compositions with the $K_2O$-$MgO$-$Al_2O_3$-$B_2O_3$-$SiO_2$-F field with microstructures consisting of very large (>150 microns), essentially two-dimensional crystals of high aspect ratio uniformly distributed throughout the articles. This feature of easily cleavable flakes dispersed in a brittle matrix imparts excellent machineability, high fracture energy, and superior thermal shock damage resistance.

7 Claims, 6 Drawing Figures

MICA GLASS-CERAMICS

A glass-ceramic article is produced through the controlled crystallization in situ of a glass article. Thus, the production of a glass-ceramic article conventionally contemplates three basic steps: First, a glass-forming batch is compounded to which a nucleating or crystallization-promoting agent is usually admixed; second, the batch is melted to a homogeneous liquid and the melt simultaneously cooled and shaped to a glass article of desired dimensions and configuration; and, third, this glass article is exposed to a specifically defined heat treatment utilizing a time-temperature schedule that results in nuclei being initially formed in the glass which provide sites for the growth of crystals thereon as the heat treatment is continued.

The basic patent in the area of glass-ceramics, viz., U.S. Pat. No. 2,920,971, incorporates an extensive review of the practical considerations and theoretical aspects that underlie the production of glass-ceramic articles as well as a detailed discussion of the mechanism involved in the crystallization step. Reference is hereby made thereto for further explanation of those matters.

United States Application Ser. No. 53,121, filed July 8, 1970, now U.S. Pat. No. 3,289,293 describes the manufacture of glass-ceramic articles wherein synthetic fluormica comprises the primary crystal phase, the crystals being relatively large, e.g., up to 10 microns and longer, with a high aspect ratio, perhaps up to 10:1. Such articles were made from glasses consisting essentially, by weight on the oxide basis, of about 25–60 percent $SiO_2$, 15–35 percent $R_2O_3$, wherein $R_2O_3$ consists of 5–15 percent $B_2O_3$ and 5–25 percent $Al_2O_3$, 2–20 percent $R_2O$, wherein $R_2O$ consists of 0–15 percent $Na_2O$, 0–15 percent $K_2O$, 0–15 percent $Rb_2O_3$, and 0–20 percent $Cs_2O$, 4–25 percent $MgO$ + 0–7 percent $Li_2O$, wherein the total $MgO$ + $Li_2O$ consists of 6–25 percent and 4–20 percent F. The basic mica structure developed through the crystallization in situ of those glasses corresponded to a fluorophlogopite solid solution. This solid solution was believed to encompass the three components: normal fluorophlogopite ($KMg_3AlSi_3O_{10}F_2$); boron fluorophlogopite; and a subpotassic aluminous phlogopite, the exact composition of which was unknown but was thought to approximate the formula $K_{0.5}Mg_2Al_{0.83}BSi_3O_{10}F_2$. Further, solid solution appeared to exist between those crystal species and the lithia-containing fluormicas, e.g., polylithionite, $KLi_2AlSi_4O_{10}F_2$.

That application pointed out that the best machineability was secured where the product was very highly crystalline and the crystals, themselves, were large and exhibited high aspect ratios. A further feature of such products was their ability to resist breakage resulting from thermal shock. This phenomenon was believed to be due to an interlocking microstructure of the long platy crystals which allowed the products to adjust to thermal expansion and contraction.

Glass-ceramic bodies wherein synthetic fluormica comprises the predominant and, preferably, only crystal phase are especially useful in the application of mold, nozzle, and trough material for casting such nonferrous metals as aluminum and copper. The glass-ceramic bodies described in the above-mentioned patent application possess the necessary requirements of good machineability and non-wettability by those metals. Nevertheless, improved resistance to thermal shock has been demanded such that the material can survive the sudden contact of molten metal without failure.

We have discovered that products having substantially enhanced resistance to thermal shock can be secured from a narrowly defined composition range carved out of the relatively broad field of readily machineable glass-ceramic bodies disclosed in the above-mentioned patent application. Such articles exhibit a microstructure consisting of a uniform distribution of very large mica flakes of high aspect ratio. The percent, by volume, of crystallinity ranges between about 50–75 percent with the flakes, themselves, having a diameter of at least 150 microns, with the average preferably ranging between about 200–500 microns, and having an aspect ratio (the ratio of the diameter-to-thickness) greater than 20.

This type of microstructure can be achieved in the compositional area of the subpotassic fluorophlogopite solid solution glass-ceramics ($K_{1-x}Mg_3Al_{1-x}O_{10}F_2$), which contain excess alumina and with additions of $B_2O_3$. Thus, the base glasses for such glass-ceramic articles consist essentially, in weight percent on the oxide basis, of about 4–6 percent $K_2O$, 16–24 percent $MgO$, 14–19 percent $Al_2O_3$, 6–14 percent $B_2O_3$, 35–45 percent $SiO_2$, and 6–10 percent F. The subpotassic nature of these compositions causes a decrease in the nucleation rate as well as a significant increase in the lateral grain growth rate of the fluormica crystals, this latter phenomenon believed to be due to a weak cross-bonding tendency. The resulting microstructure contains extremely large fluormica crystals having very high aspect ratios. The addition of $B_2O_3$ tends to further promote grain growth of the fluormica flakes by increasing the fluidity of the growth medium.

The heat treatment applied to the glass articles to cause the crystallization in situ thereof can be of vital importance in securing the desired extremely large flakes of fluormica exhibiting a very high aspect ratio. Hence, the preferred practice contemplates a schedule designed to produce very large fluormica crystals without sacrificing percent crystallinity. It is particularly important to utilize high temperatures for the crystallization, i.e., the crystallization temperature should approach the deformation temperature of the body.

The classical approach to thermal stress fracture in a material assumes failure when the maximum thermal stress level equals the tensile strength. Hence, the thermal stress fracture resistance parameter R represents the maximum temperature difference that a specimen can withstand without failure. This hypothesis can be expressed as $$R = S_t (1-V)/E \alpha$$

where $S_t$ is fracture strength, $E$ is Young's modulus of elasticity, $\alpha$ is coefficient of thermal expansion, and $V$ is Poisson's Ratio. According to the equation, high values of strength and low values of $E$, $\alpha$, and $V$ would yield high thermal stress values. However, the resistance to thermal shock displayed by the very coarse-grained articles of the present invention cannot be explained through the classical theory since the critical quenching temperatures at which thermal fracture nucleates decreases with increasing strength.

Studies of fracture morphology in fluormica glass-ceramic articles have demonstrated that cracks normally follow the mica cleavage planes and mica-glass interfaces, thereby deflecting and often being blunted.

Fracture deflection, blunting, and larger fractured surface areas increase the effective surface energy which ranges about $1-4 \times 10^4$ ergs/cm$^2$, about 3-10 times larger than that of glasses or other conventional glass-ceramics. Generally, the effective surface energy or fracture energy increases with increasing crystallinity and mica flake diameter. Although such fracture energy values are not sufficiently great to give rise to extremely high mechanical impact resistance (typical plastics are in the range of $5-10 \times 10^5$ ergs/cm$^2$), they do exert a significant effect upon thermal shock resistance.

The fluormica glass-ceramics of the instant invention follow the stored elastic energy criterion which states that the lower the stored elastic energy (i.e., the lower the strength and higher the elastic modulus), the higher is the resistance to damage from thermal shock. In order to increase the resistance to thermal shock of the fluormica glass-ceramics of the present invention which have high coefficients of thermal expansion, normally $75-100 \times 10^{-7}/°C$. over the range $25°-800°C$., it is necessary to minimize damage from thermal shock. This has been achieved by minimizing the stored elastic energy (low strength and high elastic modulus) and by maximizing the dissipation of elastic energy upon fracture propagation (high fracture energy). Thus, the present very coarse-grained subpotassic fluormica glass-ceramic bodies will exhibit mechanical strengths, in terms of modulus of rupture, within the range of only about 2,000-5,000 psi but will display excellent resistance to thermal shock. Hence, samples about 2 inches $\times$ 1 inch $\times$ 6 inches will survive repeated immersions from room temperature into a bath of molten aluminum operating at 750°C., whereas similar compositions, but with finer-grained crystals and modulus of rupture values exceeding 6,000 psi, will not survive.

In the most general terms, our invention comprises melting a batch for a glass consisting essentially, by weight on the oxide basis, of about 4-6 percent $K_2O$, 16-24 percent MgO, 14-19 percent $Al_2O_3$, 6-14 percent $B_2O_3$, 35-45 percent $SiO_2$, and 6-10 percent F, cooling the melt at least below the transformation range thereof and shaping a glass article therefrom, and thereafter heating this glass article to a temperature approaching the deformation temperature, commonly $1,000°-1,150°C$. for a sufficient length of time to cause the crystallization of the glass article in situ. The transformation range has been defined as that temperature at which a liquid melt is deemed to have been transformed into an amorphous solid, that temperature commonly being considered as lying between the strain point and annealing point of a glass. Inasmuch as the crystallization step is a process which is both time and temperature dependent, it will be readily appreciated that at temperatures approaching the upper extreme of the crystallization range only short dwell periods will be required, e.g., 1/2 hour or even less; whereas, at temperatures in the cooler extreme of the range, longer maintenance periods will be necessitated, perhaps up to 24 hours.

The preferred practice for crystallization contemplates two steps: first, the glass article is heated to a temperature somewhat above the transformation range thereof, i.e., between about $600°-900°C$., and held within that temperature field for a sufficient period of time to establish extensive nucleation and begin crystal development; and, subsequently, second, the nucleated article is heated to a temperature between about $1,000°-1,150°C$. and maintained within that range for a sufficient length of time to grow the desired large-grained fluormica crystals. Commonly, a nucleation hold of about 1-6 hours is utilized followed by a crystallization treatment of about 1-8 hours.

We have discovered that the MgO content of the glass plays a very important role in the crystallization process. Thus, at the higher MgO contents within the operable range, i.e., at about 19 1/2-24 percent MgO, the glass melt ought to be cooled relatively slowly to the transformation range. Hence, the glass melt should be maintained at temperatures above the annealing point of the glass, but below the temperature at which the melt has a viscosity of about 1,000 poises, for a time sufficient to develop a relatively few large nuclei scattered throughout the mass but not for such a length of time as to effect crystallization throughout the body. This latter crystallization exhibits a spherulitic and columnar structure resulting in a weak body containing pits and voids. Normally, the glass body will be held within the temperature range of about $850°-1,100°C$. to initiate this nucleation, the dwell time therein being dependent upon the temperatures employed. An empirical determination of the time required can be made visually. Hence, when the glass body takes on simply a light translucent cast, i.e., similar in appearance to a light opal glass, it can be assumed that fine phase separation only has occurred which results in the growth of undesirably fine-grained crystals during the subsequent heat treatment step. Where the glass body is strongly opaque, however, incipient crystallization plus phase separation will have occurred such that the desired large crystals will be developed in the subsequent crystallization procedure. Finally, of course, this incipient crystallization cannot be permitted to grow to such proportions that the crystals take on a spherulitic or columnar structure. Usually, this nucleation step requires about 5-30 minutes, depending upon the temperature utilized, before the body is permitted to cool below the transformation range.

This nucleation practice can be accomplished in various ways. For example, the molten glass can be cooled relatively slowly as it leaves the melting unit or the melt can be run into a mold or other glass-forming apparatus and maintained therewithin at a temperature above the annealing point of the glass for the required length of time. No matter how undertaken, the desired very large flakes of fluormica were not to be secured without this initial nucleation step where the MgO content of the glass is greater than about 19 1/2 percent.

Where the MgO content of the glass is less than about 19 1/2 percent, there appears to be no need for this initial nucleation above the annealing point of the glass. This situation is believed to be due to two factors: (1) the lack of MgO appears to increase the stability of the crystalline assemblage which precedes the formation of the desired fluormica crystals. Thus, norbergite and mullite are initially formed. The temperature at which this crystalline assemblage transforms to fluormica through a solid state reaction with the $K_2O$-rich matrix glass appears to increase from about $850°-900°C$. to about $1,000°C$. and, perhaps, up to $1,050°C$. The increase in the transformation temperature leads to a decrease in nucleation rate and in the growth rate of the formed fluormica crystals. As a consequence, a MgO content of less than 19 1/2 percent results in glass-ceramic products containing very large flakes of fluormica, i.e., larger than 150 microns in diameter, with aspect ratios of at least 20; and (2) the lack of MgO also reduces the overall amount of crystallization that can take place in the body resulting in the crystals that are grown being very large.

in accordance with conventional glass analytical practice. The retention of fluoride in these batch compositions is quite high at these melting temperatures, analyses thereof in the glass bodies illustrating losses of less than 25 percent and, frequently, of only about 5 percent.

TABLE I

|  | 1 | 2 | 3 | 4 | 5 | 6 | 7 | 8 | 9 |
|---|---|---|---|---|---|---|---|---|---|
| $SiO_2$ | 38.1% | 37.9% | 37.6% | 39.0% | 40.2% | 40.9% | 38.8% | 39.8% | 40.8% |
| $B_2O_3$ | 11.3 | 11.1 | 11.1 | 11.2 | 11.3 | 11.2 | 11.1 | 11.1 | 11.1 |
| $Al_2O_3$ | 16.3 | 16.2 | 16.1 | 16.3 | 16.4 | 16.3 | 16.2 | 16.2 | 16.2 |
| MgO | 21.5 | 21.6 | 21.6 | 20.8 | 19.1 | 18.9 | 20.7 | 19.7 | 18.7 |
| $K_2O$ | 4.5 | 4.5 | 4.4 | 4.6 | 4.7 | 4.6 | 4.6 | 4.6 | 4.6 |
| F | 8.2 | 8.7 | 9.2 | 8.1 | 8.3 | 8.1 | 8.6 | 8.6 | 8.6 |

Table I records compositions, expressed in weight percent on the oxide basis, of thermally crystallizable glasses which, when subjected to the heat treatment procedure of this invention, were crystallized in situ to glass-ceramic articles wherein the crystals were greater than 150 microns in diameter, had an aspect ratio of at least 20, were randomly oriented and interlocking, and comprised more than 50 volume percent of the articles. The ingredients constituting the glass batches may be any materials, either oxides or other compounds, which, on being melted together, are converted to the desired oxide compositions in the proper proportions. The batch ingredients were compounded, ballmilled together to aid in achieving a homogeneous melt, and thereafter melted in closed platinum crucibles for about five hours at about 1,450°C. In the instances of the low-MgO compositions, the melts were poured into cold steel molds to yield slabs of various sizes. These slabs were immediately transferred to an annealer operating at 650°C. In the examples of high-MgO compositions, the melts were poured into graphite molds which, exhibiting insulating properties caused the solidifying melt to be exposed to temperatures between about 850°–1,100°C. for periods greater than five minutes, normally about 10–30 minutes. The resulting slabs were then placed into an annealer operating at 650°C.

Inasmuch as it is not known with which cations the fluoride is combined, it is merely reported as fluoride Following annealing, the glass slabs were placed within an electrically fired furnace and exposed to the heat treatment schedules set forth in Table II. Upon completion of the crystallization heat treatment, the articles were either removed directly from the furnace into the ambient atmosphere or the electric current to the furnace was cut off and the articles merely left therein and permitted to cool to room temperature. This latter practice has been defined as "cooling at furnace rate," that rate of cooling having been estimated to average about 1°–3°C./minute. In each example, the temperature was raised at the rate of about 5°C./minute to each dwell temperature.

Table II further reports a visual description and a semiquantitative measure of machineability of each crystallized article. The expression "coarse-grained" indicates crystal sizes of 150 microns and somewhat larger whereas "very coarse-grained" denotes crystal sizes of 250 microns and greater. On the machineability index employed here, the indices of cold rolled steel, aluminum, and brass are 78, 32, and 15, respectively. Measurements of modulus of rupture and the coefficient of thermal expansion over the temperature range of 25°–800°C. ($\times 10^{-7}$/°C.) are also recorded where determined on individual products.

TABLE II

| Example No. | Heat Treatment | Visual Description | Sample Size | Modulus of Rupture | Exp. | Thermal Machineability |
|---|---|---|---|---|---|---|
| 1 | Hold at 800°C. for 4 hours<br>Hold at 1000°C. for 4 hours | White, opaque, fine-grained | 1" × 2" × 6" | 12,500 | 82 | 15 |
| 1 | Hold at 800°C. for 4 hours<br>Hold at 1060°C. for 4 hours | White, opaque, coarse-grained | 1" × 2" × 6" | 4,000 | 82 | 4 |
| 2 | Hold at 800°C. for 4 hours<br>Hold at 1050°C. for 4 hours | White, opaque, coarse-grained | 1" × 2" × 6" | 3,000 |  | 4 |
| 3 | Hold at 800°C. for 4 hours<br>Hold at 1075°C. for 4 hours | White, opaque, coarse-grained | 1" × 2" × 6" |  | 83 | 4 |
| 4 | Hold at 800°C. for 4 hours<br>Hold at 1040°C. for 4 hours | White, opaque, coarse-grained | 1" × 2" × 6" | 3,400 |  | 5 |
| 5 | Hold at 800°C. for 4 hours<br>Hold at 1050°C. for 4 hours | White, opaque, coarse-grained | 1" × 2" × 6" |  | 82 | 4 |
| 6 | Hold at 750°C. for 6 hours<br>Hold at 1030°C. for 4 hours | White, opaque, very coarse-grained | ¾" × 2" × 6" | 2,000 | 81 | 3 |
| 7 | Hold at 850°C. for 2 hours<br>Hold at 1030°C. for 4 hours | White, opaque, coarse-grained | 1" × 2" × 5" |  | 82 | 5 |
| 8 | Hold at 800°C. for 4 hours<br>Hold at 1030°C. for 4 hours | White, opaque, very coarse-grained | 1" × 2" × 5" | 2,900 | 83 | 2 |
| 9 | Hold at 800°C. for 4 hours<br>Hold at 1030°C. for 4 hours | White, opaque, very coarse-grained | 1" × 2" × 5" | 2,200 |  | 2 |

Table II illustrates the range of physical properties which the products of the instant invention can exhibit. Thus, both the compositional and process parameters outlined above are vital in securing the desired microstructure with accompanying physical properties. The degree of machineability is a function of the size and amount of the crystallization. Thus, the more residual glass present in the glass-ceramic body the harder and, consequently, the less machineable it will be. Furthermore, where the amount of residual glass is held constant, those articles composed of fine-grained crystals and/or crystals with a low aspect ratio will tend to be harder. Therefore, to secure the greatest degree of machineability, the crystallinity of the article should be high and the crystals, themselves, ought to have a high aspect ratio.

The coefficients of thermal expansion of these fluormica glass-ceramic materials are relatively high, viz., between about $75-100 \times 10^{-7}/°C$. over the temperature range 25°–800°C., but the resistance to cracking and breakage from thermal shock thereof is phenomenal. An explanation of this phenomenon has been provided above wherein the stored elastic energy criterion was discussed. Thus, the crystallized articles of this invention demonstrate low mechanical strengths (modulus of rupture values between 2,000–5,000 psi) but high fracture energies ($2-5 \times 10^4$ ergs/cm$^2$). These characteristics are the result of the extremely large, interlocking crystals of fluormica exhibiting aspect ratios of at least 20.

FIG. 1 graphically depicts the results of thermal shock tests involving samples 3/16 inch diameter × 2 inches in length of Example 1 in which modulus of rupture measurements were made after the samples had been plunged into water at room temperature from a furnace operating at the recited high temperatures. Table III reports the variation in crystal morphology resulting from different crystallization schedules prior to the thermal shock test. In each schedule, the temperature was raised at a rate of about 5°C./minute to the hold temperature and the crystallized article cooled at furnace rate to room temperature.

phase separation and incipient crystallization which is present in the glass body of Example 1 when the melt is cooled relatively slowly to a glass, e.g., by pouring the melt into graphite molds. The body takes on an opaque appearance due to the clustering of crystals in the residual glassy matrix. The white bar at the base of the photograph represents one micron.

FIG. 5 is a scanning electron micrograph of the coarse-grained crystallized material of Example 1 as exemplified in sample (c) of Table III above. Here, the white circle at the bottom right of the photograph represents 120 microns. The wide difference in crystal size between the product shown in FIG. 3 and that presented in the instant photograph is immediately apparent. This comparison dramatically illustrates the vital function which slow cooling of the melt has upon the microstructure of the final crystallized bodies. Hence, at high concentrations of MgO, viz., greater than about 19.5 percent by weight, the desired coarse-grained crystals of fluormica cannot be obtained without the step of slow cooling the melt.

FIG. 6 is a scanning electron micrograph of the coarse-grained crystallized product of Example 6 wherein the melt was rapidly cooled to a glass by being poured into a steel mold and the glass slab then crystallized in accordance with the schedule set out in Table II above. The white circle at the bottom right of the photograph represents 240 microns, thereby indicating the average crystal size to exceed about 250 microns. This photograph is illustrative of the fact that slow cooling of the melt is not required to secure coarse-grained fluormica crystals where the MgO concentration is low, i.e., less than about 19 1/2 percent by weight.

To demonstrate the phenomenal resistance to thermal shock which the article of the instant invention possess, 1 inch × 2 inch × 6 inch samples of products

TABLE III

| | Heat Treatment | Volume Percent Crystallinity | Crystal Diameter ($\mu$) | Aspect Ratio | MOR (psi) | Fracture Energy (ergs/cm$^2$) |
|---|---|---|---|---|---|---|
| (a) | 800°C. for 4 hours 1000°C. for 4 hours | 65 | 50 | 20 | 12,500 | $3.0 \times 10^4$ |
| (b) | 800°C. for 4 hours 1040°C. for 6 hours | 65 | 70 | 30 | 7,500 | $4.0 \times 10^4$ |
| (c) | 800°C. for 4 hours 1060°C. for 4 hours | 65 | 300 | 50 | 4,000 | $3.6 \times 10^4$ |

FIG. 1 illustrates that sample (c) did not lose strength after quenching up to a 900°C. furnace temperature. That sample contained the largest fluormica flakes with the highest aspect ratio. The mechanical strength thereof was low but the fracture energy was relatively high.

Figure 1:
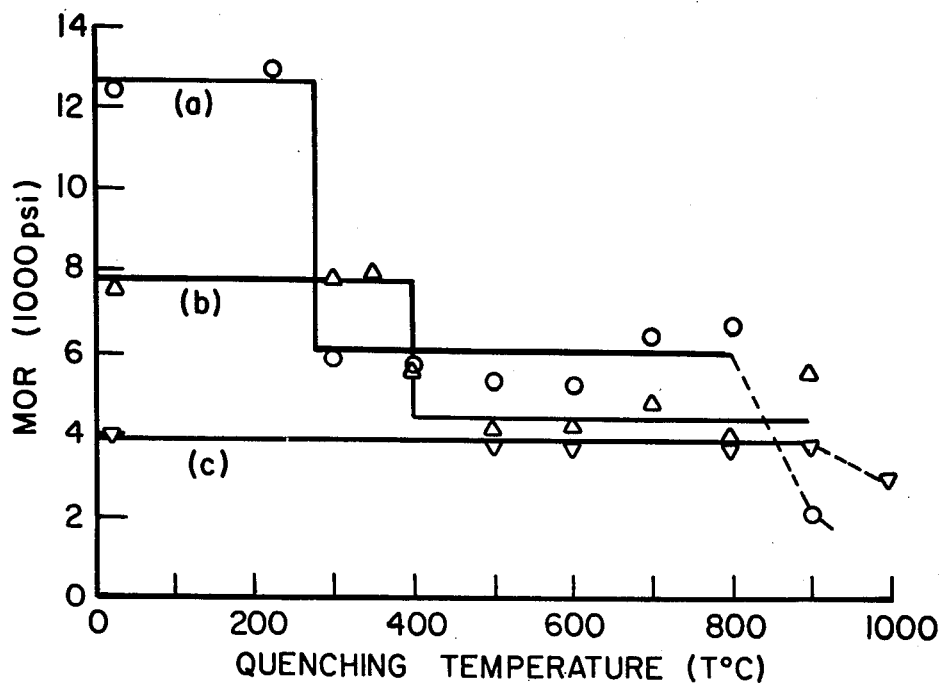
Figure 2:
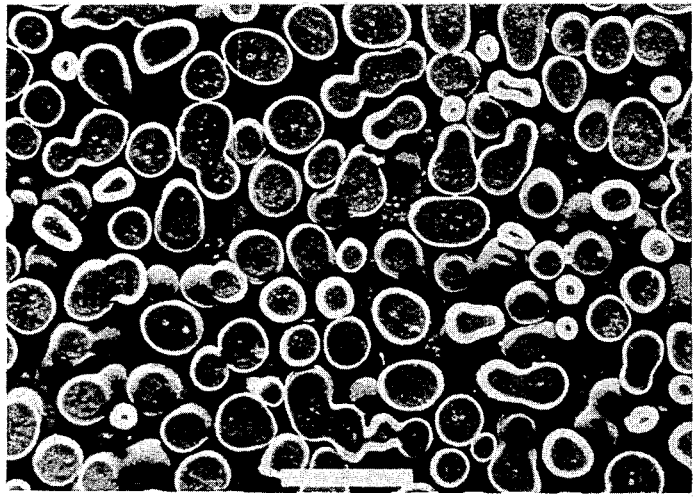
FIG. 2 is a replica electron micrograph of the fine-grained phase separation which is observed in the glass body of Example I when the melt is cooled rapidly to a glass, e.g., by pouring the melt into steel molds. The white bar at the base of the photograph represents one micron.
Figure 3:
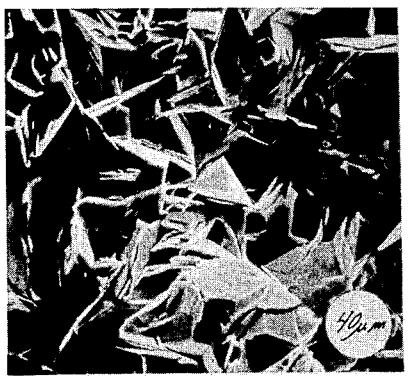
FIG. 3 is a scanning electron micrograph of the fine-grained crystallized body of Example 1 as exemplified in sample (a) of Table III above. The white circle at the bottom right of the photograph represents 40 microns, thereby indicating the average crystal size to be on the order of 50 microns.
Figure 5:
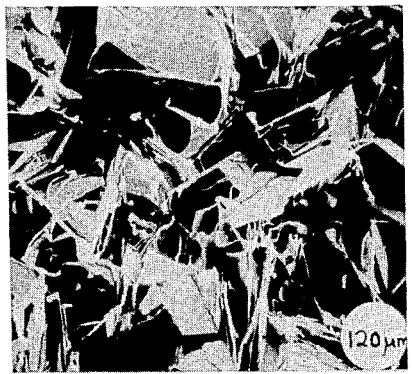
Figure 4:
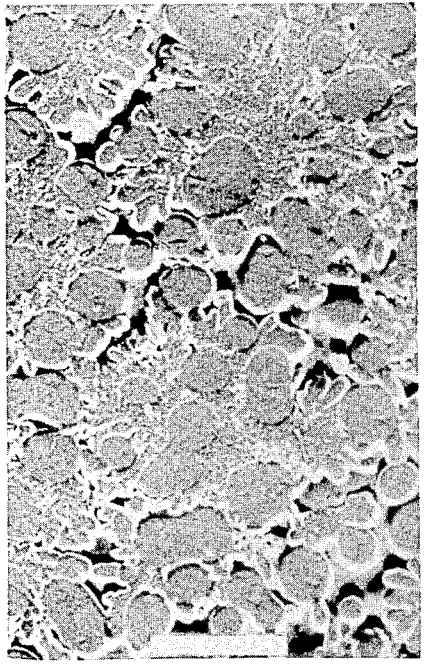
Figure 6:

FIG. 4 is a replica electron micrograph of the coarser (a), (b), and (c) from Table III were taken from room temperature and were plunged into a bath of molten aluminum operating at 750°C., held therein for 60 minutes, and then lifted out into the ambient atmosphere. Samples (a) and (b) began to crack and disintegrate at the initial immersion whereas the coarse-grained products of (c) survived repeated cyclings of immersions in the molten bath with little apparent injury.

The optimum physical properties plus resistance to thermal shock are secured where the base composition consists solely of the above-recited components in the indicated proportions. Nevertheless, minor additions of such compatible metal oxides as $P_2O_5$, $TiO_2$, $ZrO_2$, BaO, SrO, CaO, FeO, ZnO, CoO, NiO, MnO, CdO, $GeO_2$, $SnO_2$, and PbO can be tolerated. Individual additions should not exceed more than about 5 percent and the total of all such additions ought not to be greater than about 10 percent by weight. $Na_2O$ is preferably completely absent but can be tolerated up to about 2 percent and $Li_2O$ may replace MgO up to about 2 percent. $Rb_2O$ and/or $Cs_2O$ may replace $K_2O$ but such substitution increases batch costs.

We claim:

1. A method for producing a glass-ceramic article demonstrating a modulus of rupture of about 2,000–5,000 psi, a fracture energy value of about $2-5 \times 10^4$ ergs/cm$^2$, and exceptional resistance to thermal shock consisting essentially of fluorophlogopite solid solution crystals having a diameter of at least 150 microns and an aspect ratio of at least 20 dispersed in a glassy matrix, said crystals constituting between about 50–75 percent by volume of the article, which comprises:
   a. melting a batch for a glass consisting essentially, by weight on the oxide basis, of about 4–6 percent $K_2O$, 19.5–24 percent MgO, 14–19 percent $Al_2O_3$, 6–14 percent $B_2O_3$, 35–45 percent $SiO_2$, and 6–10 percent F;
   b. cooling the melt to a glass article in such a manner that the temperature thereof remains between the annealing point of the glass and the temperature at which the melt exhibits a viscosity of about 1,000 poises for at least 5 minutes and then cooling said article to at least below the transformation range thereof; and thereafter
   c. exposing said glass article to a temperature between about 1,000°–1,150°C. for a sufficient length of time to cause said article to crystallize in situ to a glass-ceramic article consisting essentially of fluorophlogopite solid solution dispersed in a glassy matrix.

2. A method according to claim 1 wherein the glass article is held between the annealing point and the temperature at which the melt exhibits a viscosity of about 1,000 poises for about 5 to 30 minutes.

3. A method according to claim 1 wherein said time to cause the article to crystallize in situ ranges between about 1/2–24 hours.

4. A method according to claim 1 wherein said glass article is first exposed to a temperature between about 600°–900°C. for about 1–6 hours and thereafter exposed to a temperature between about 1,000°–1,150°C. for about 1–8 hours to cause the article to crystallize in situ.

5. A method for producing a glass-ceramic article demonstrating a modulus of rupture of about 2,000–5,000 psi, a fracture energy value of about $2-5 \times 10^4$ ergs/cm$^2$, and exceptional resistance to thermal shock consisting essentially of fluorophlogopite solid solution crystals having a diameter of at least 150 microns and an aspect ratio of at least 20 dispersed in a glassy matrix, said crystals constituting between about 50–75 percent by volume of the article, which comprises:
   a. melting a batch for a glass consisting essentially, by weight on the oxide basis, of about 4–6 percent $K_2O$, 16–19.5 percent MgO, 14–19 percent $Al_2O_3$, 6–14 percent $B_2O_3$, 35–45 percent $SiO_2$, and 6–10 percent F;
   b. cooling the melt to a glass article at least below the transformation range thereof; and
   c. exposing said glass article to a temperature between about 1,000°–1,150°C. for a sufficient length of time to cause said article to crystallize in situ to a glass-ceramic article consisting essentially of fluorophlogopite solid solution dispersed in a glassy matrix.

6. A method according to claim 5 wherein said time to cause the article to crystallize in situ ranges between about 1/2–24 hours.

7. A method according to claim 5 wherein said glass article is first exposed to a temperature between about 600°–900°C. for about 1–6 hours and thereafter exposed to a temperature between about 1,000°–1,150°C. for about 1–8 hours to cause the article to crystallize in situ.

* * * * *